United States Patent Office 3,591,419
Patented July 6, 1971

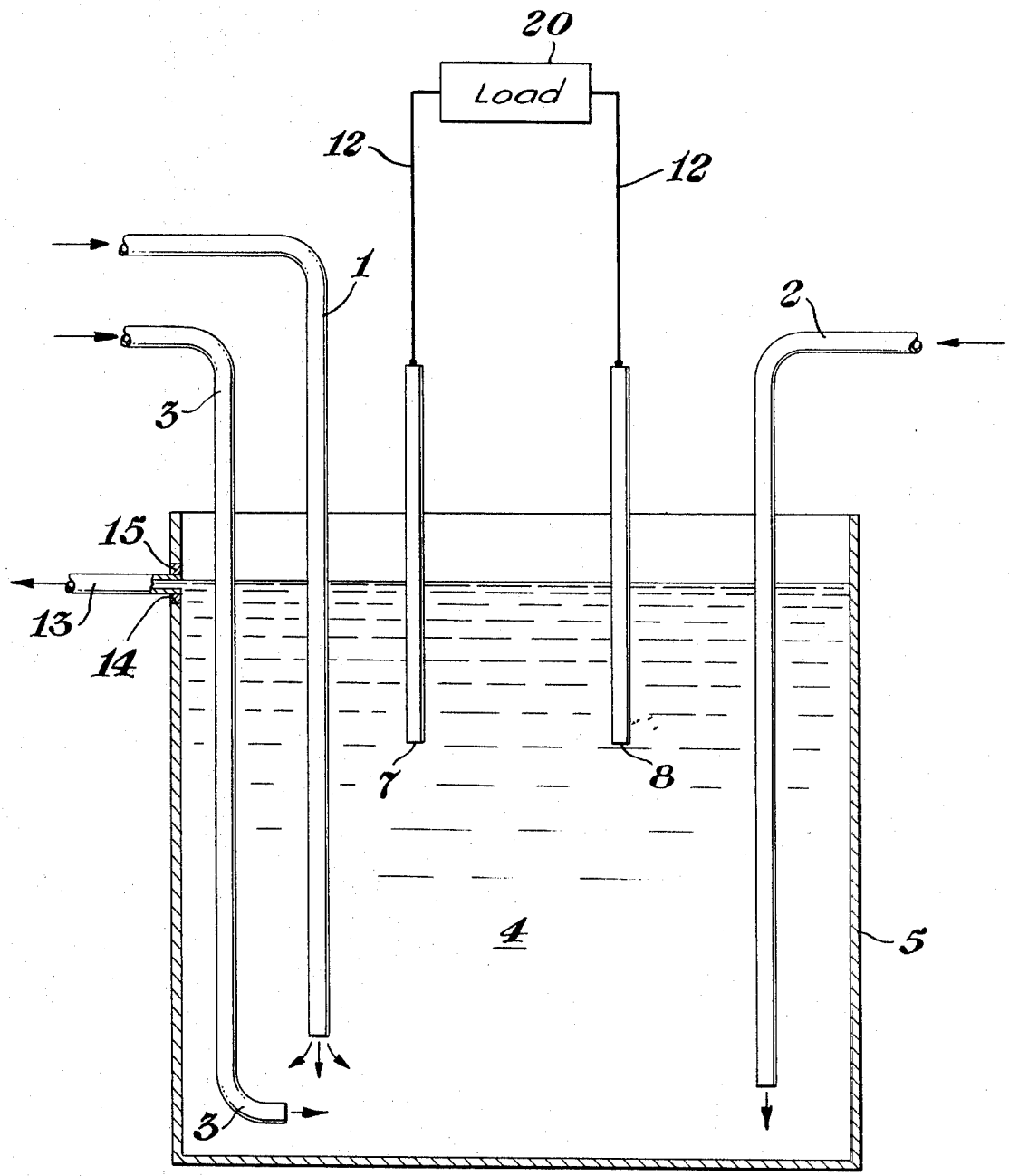

3,591,419
PROCESS FOR GENERATING ELECTRICAL
ENERGY USING MANGANESE DIOXIDE
WITH OXIDIZING GAS
Charles Eugene Hamilton, Midland, Mich., assignor to
The Dow Chemical Company, Midland, Mich.
Filed June 27, 1968, Ser. No. 740,584
Int. Cl. H01m 27/00
U.S. Cl. 136—86                                    6 Claims

ABSTRACT OF THE DISCLOSURE

A fuel cell and method of its operation wherein organic materials are contacted with a suitable oxidizing system in the presence of an electron-collecting system to produce electrical current.

BACKGROUND OF THE INVENTION

Presently in the United States as well as other areas, problems of pollution and waste control have reached immense proportions. Many methods have been proposed whereby organic waste materials could be disposed of by chemical or physical means. The crux of the present invention resides in a novel means for disposal of organic wastes, wherein simultaneously there is realized the relatively economic generation of electrical power.

Heretofore, a practical method for generating electrical energy while simultaneously degrading organic waste materials by involving manganese dioxide oxidation has not been known.

It is a principal object of the present invention to provide a unique, economical means for simultaneously generating electrical power and degrading organic waste materials.

It is another object of the present invention to provide a novel process and apparatus which not only satisfactorily disposes of waste organic materials but simultaneously provides for the conversion of such materials into useful energy.

These and other objects and advantages readily will become apparent from the detailed description presented hereinafter when read in conjunction with the appended drawing.

DESCRIPTION OF THE DRAWING

The figure of the drawing is a sectional view of one fuel cell of the present invention.

SUMMARY OF INVENTION

In general, the present invention comprises an apparatus and process for producing and harvesting electrical energy wherein an oxidizable organic material is contacted with an electrolyte-oxidizing system in the presence of an electron-collecting device.

Ordinarily the electrolyte-oxidizing system is based on manganese dioxide. In actual operation, manganese dioxide in combination with an oxidizing gas and an aqueous brine solution has been found to perform the dual electrolyte-oxidizing functions very well. Alternatively, manganese dioxide alone can be combined with a dispersion of the organic material, i.e. slurries, sludges or concentrated solutions of the organic material. In this embodiment, the manganese dioxide itself serves both as electrolyte and oxidizing agent.

Organic materials which can be employed include, for example, hydrocarbons, halogenated hydrocarbons, phenols, alcohols, aldehydes, ethers, derivatives of organic acids and other organic materials. A convenient source of these materials are industrial and other waste streams and dispersions.

The oxidizing gas employed can be either air or oxygen.

The terms "brine solution" or "salt solution" as employed in the present application are intended to indicate an ionic media suitable for the conveyance of electrons, such as any commonly employed aqueous electrolytic media. As an example, a dilute solution of alkali metal or alkaline earth chlorides provides a satisfactory media.

In the operation using an electrolyte-oxidizing system of manganese dioxide, oxidizing gas, and aqueous inorganic salt solution, the process of the present invention comprises providing an aqueous salt solution containing at least about 0.01 mole of salt per liter of solution, immersing two suitable collecting electrodes in the salt solution, admixing therewith either simultaneously or in succession, waste organic materials, an oxidizing gas e.g. air or oxygen, and an amount of particulated manganese dioxide to provide a manganese dioxide/organic material weight ratio of at least about 5, and maintaining the pH level of the resulting reaction mass at from about 5 to about 8.

Where manganese dioxide alone is to be employed as the electrolyte-oxidizing system, the process of the present invention comprises providing a particulated manganese dioxide and a sludge, slurry, or concentrated aqueous solution of organic material, admixing the organic material and manganese dioxide, and contacting the admixture of organic material and manganese dioxide with an appropriate electron collecting device.

The nature and relative amounts of the organic materials, and manganese dioxide employed are substantially similar to the types and relative amounts of these materials as employed in the process described above wherein a salt solution forms part of the oxidizing system. However, since manganese dioxide must serve as both oxidizer for the organic materials, and as an electrolyte in this embodiment, ordinarily water is kept at a minimum. Employing saturated solutions of organic materials, or relatively viscous aqueous slurries or sludges satisfies this requirement.

The present invention can be carried out in a fuel cell depicted in the figure of the drawing. With reference to the figure, the fuel cell comprises a fuel cell casing 5, which contains an electrolyte-oxidizing system 4, a first conduit 1, said conduit introducing organic materials into the fuel cell casing. The fuel cell casing also contains a second conduit 2, said second conduit introducing manganese dioxide into said fuel cell casing, and a third conduit 3, said third conduit introducing oxidizing gas into said fuel cell casing.

The conduits communicate with the interior of the fuel cell casing, and are in contact with the electrolyte-oxidizing system contained therein. The conduits also communicate with a source of supply (not shown) for each of said organic materials, manganese dioxide, and oxidizing gas.

Optionally the fuel cell case can be fitted with a fourth conduit 13, said conduit providing for disposal of oxidized organic materials. Said fourth conduit can communicate with the electrolyte-oxidizing system through opening 14 in the fuel cell casing which contains bushings 15 which form a water-tight seal around conduit 13.

Said fuel cell casing 5 also contains electrodes 7 and 8 which communicate with said electrolyte-oxidizing system and with an external electrical system 12.

In operation, if a brine electrolyte is employed, a dispersion of organic material manganese dioxide and oxidizing gas are transported into the fuel cell and brine electrolyte contained therein, through conduits 1 and 2 and 3 respectively. A reaction takes place within the fuel cell and current is produced which is collected at the electrodes, and transmitted into external electrical circuit 12.

If the fuel cell casing is fitted with an oxidized organic materials disposal conduit as the volume of the electrolyte-oxidizing system increases, a volumetric equilibrium will arise between incoming materials and exhausted reactants (including oxidized organics) passing from the fuel cell through said organic materials disposal conduit 13.

Where the dispersion of organic matter consists of an aqueous slurry or sludge previously sufficiently aerated, it is not necessary to introduce an oxidizing gas into the fuel cell.

Where manganese dioxide is to be employed as electrolyte-oxidizing system without the use of a brine electrolyte, the oxidizing gas and conduit 3, would not be needed if the physical nature of the reactants permitted some exposure to air.

The electrodes employed can be any which are commonly employed to collect electrons, but preferably, a platinum electrode will be employed.

The fuel cell case should consist of a material resistant to corrosion, and preferably glass should be employed. The leads to the electrodes consist of any commonly employed electrical conducting material, but copper is preferred. The conduits can consist of any material substantially unreactive with the materials employed.

PREFERRED EMBODIMENTS

In one preferred embodiment of the present invention, brine solution is contacted simultaneously with a well-aerated aqueous slurry of organic materials and manganese dioxide catalyst, at ambient conditions of temperature and pressure while maintaining the resulting electrolytic mixture at a substantially neutral pH, and the resulting electrical current is collected with suitable electrodes.

A second preferred embodiment of the present invention comprises providing a gamma particulated manganese dioxide catalyst, contacting and admixing therewith a concentrated aqueous solution, or an aqueous sludge or slurry of oxygen-containing organic material, and contacting the admixture of organic material and manganese dioxide with an appropriate electron collecting device.

Preferably the ratio of manganese dioxide/organic materials can range from about 5 to about 10.

A preferred form of manganese dioxide is gamma $MnO_2$ with a surface area of at least about 10 square meters per gram.

The following examples will serve to better illustrate the present invention but are not intended as limits thereof.

EXAMPLE 1

Employing a fuel cell substantially similar to the one depicted in the figure of the drawing, about 25 grams of gamma manganese dioxide having a surface area of 56 meters$^2$/gram was added to a brine solution containing about 1000 milligrams of sodium chloride per liter of solution (~0.02 molar). The pH of the system was maintained at about 7. An electrical output of about 2.5 microamperes was measured on a Sargent MR Recorder (a product of the Sargent Company) with a full scale deflection of 12.5 microamperes. The potential of the system was about 10 millivolts.

To the above system was added 500 milligrams of phenol whereupon the output increased to 10 microamperes with a potential of from about 20 to about 30 millivolts.

The above experiments were conducted while agitating the system so as not to entrain appreciable air therein.

EXAMPLE 2

Employing the fuel cell described in Example 1, air at a flow rate of about 200 cc./minute was bubbled through the system whereupon the output was increased to about 15 to about 20 microamperes and the potential ranged between about 25 and about 50 millivolts.

EXAMPLE 3

About 25 grams of particulated gamma manganese dioxide was placed in a 50 cc. beaker and contacted with a concentrated aqueous solution of phenol to produce a sludge-like mixture. Utilizing the electrodes and measuring device employed in the experiments described in Examples 1 and 2, the current flow was measured at about 50 to about 60 microamperes, and the potential of the system was about 500 millivolts. There was a definite increase in current flow as the electrodes were positioned in closer proximity to the surface of the sludge.

Various modifications can be made in the present invention without departing from the spirit or scope thereof for it is understood that I limit myself only as defined in the appended claims.

I claim:
1. A process for generating electrical energy which comprises contacting an organic material containing at least one member selected from the group consisting of hydrocarbons, halogenated hydrocarbons, phenols, alcohols, aldehydes, derivatives of organic acids or ethers, with a manganese-dioxide based electrolyte-oxidizing system, said contacting being carried out in the presence of an election—collecting means, with the ratio by weight of manganese dioxide/organic material being at least about 5, and maintaining pH within the range from about 5 to about 8, said electrolyte-oxidizing system comprising manganese dioxide in combination with an oxidizing gas.

2. The process as defined in claim 1 wherein the organic material is present as an aqueous dispersion.

3. The process as defined in claim 1 wherein the electrolyte-oxidizing system consists of manganese dioxide gas and an aqueous salt solution containing at least about 0.02 mole of salt per liter of said salt solution.

4. The process as defined in claim 3 wherein an organic material, the oxidizing gas and said manganese dioxide are successively admixed with said salt solution.

5. The process as defined in claim 3 wherein an organic material, the oxidizing gas and said manganese dioxide are substantially simultaneously admixed with said salt solution.

6. The process as defined in claim 1, wherein the manganese dioxide is particulate gamma manganese dioxide with a surface area of at least 10 square meters per gram.

References Cited

UNITED STATES PATENTS

| | | | |
|---|---|---|---|
| 3,026,364 | 3/1962 | Jackson | 136—86 |
| 3,331,705 | 7/1967 | Davis et al. | 136—86 |
| 3,416,965 | 12/1968 | Boies et al. | 136—86 |
| 3,444,000 | 5/1969 | Gruber | 136—86 |

ALLEN B. CURTIS, Primary Examiner